United States Patent Office.

FRANCIS CURTIS, OF NEWTON, MASSACHUSETTS.

Letters Patent No. 75,128, dated March 3, 1868.

IMPROVED ROOFING-FELT.

The Schedule referred to in these Letters Patent and making part of the same.

TO ALL TO WHOM THESE PRESENTS SHALL COME:

Be it known that I, FRANCIS CURTIS, of Newton, in the county of Middlesex, and State of Massachusetts, have invented a new and useful fabrication or material to be applied to the purposes for which the well-known "Roofing-Felt" is employed; and do hereby declare the following to be a full, clear, and exact description thereof, reference being had to the specimens accompanying this specification.

The great consumption of and constantly-increasing demand for the ordinary roofing-felt has created a scarcity of material, and a corresponding increase in its cost of production. I have endeavored, in making this invention, to produce a new compound material or fabrication, which not only may be manufactured at comparatively small cost, but is in many respects preferable to and altogether more durable than that now manufactured.

The invention consists in a combination of woollen or worsted rags with wood or wood fibre, the wood being subjected to a proper chemical process in order to soften it and prepare it for being united or mixed with the ground rags.

In putting my invention into practice, the rags are to be put into a paper-engine, and ground partially into "pulp," in the ordinary manner of making paper; the wood, having been previously softened by chemical process, being then mixed or combined with the rags or partially-ground pulp, and the combined mass ground or reduced to pulp of the proper consistency. This pulp is then to be manipulated or treated upon a machine, in the ordinary manner of manufacturing paper, which produces a firm, compact, durable texture, which, after being saturated with tar or other material, as at present practised, is to be applied to the roofs of building as a water-proof covering, and, without the tar-saturation, to the sides of buildings beneath the clapboards, the material being, besides, capable of many other forms of application.

The wood, as a component part of the fabrication, of course is obtained at very small cost, in comparison to materials heretofore employed in manufacturing roofing-felt.

I claim the new fabrication or compound material above described, consisting of the combination of woollen or worsted rags with wood or wood fibre.

FRANCIS CURTIS.

Witnesses:
C. W. BALDWIN,
M. BAILEY.